United States Patent
Ikeda et al.

(10) Patent No.: US 7,379,619 B2
(45) Date of Patent: May 27, 2008

(54) SYSTEM AND METHOD FOR TWO-DIMENSIONAL KEYSTONE CORRECTION FOR AERIAL IMAGING

(75) Inventors: Roger Mitsuo Ikeda, Plano, TX (US); Jeffrey Matthew Kempf, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 625 days.

(21) Appl. No.: 11/076,077

(22) Filed: Mar. 9, 2005

(65) Prior Publication Data

US 2006/0291744 A1   Dec. 28, 2006

(51) Int. Cl.
*G06K 9/36* (2006.01)

(52) U.S. Cl. .................. 382/276; 382/260; 382/274; 382/275; 358/3.26; 358/3.27

(58) Field of Classification Search ......... 382/260, 382/274, 275, 282, 284; 358/3.26, 3.27, 358/643

See application file for complete search history.

(56) References Cited

U.S. PATENT DOCUMENTS

| | | | |
|---|---|---|---|
| 5,706,062 A | 1/1998 | Stolov | |
| 5,760,732 A * | 6/1998 | Marmarelis et al. | 342/145 |
| 6,191,827 B1 | 2/2001 | Segman et al. | |
| 6,300,924 B1 | 10/2001 | Markandey et al. | |
| 6,305,805 B1 | 10/2001 | Liebenow | |
| 6,367,933 B1 | 4/2002 | Chen et al. | |
| 6,441,780 B1 * | 8/2002 | Rog et al. | 342/357.12 |
| 6,450,647 B1 * | 9/2002 | Takeuchi | 353/69 |
| 6,456,340 B1 | 9/2002 | Margulis | |
| 6,481,855 B2 | 11/2002 | Oehler | |
| 6,491,400 B1 | 12/2002 | Chen et al. | |
| 6,493,878 B1 * | 12/2002 | Kassatly | 725/144 |
| 6,520,646 B2 | 2/2003 | Rodriguez, Jr. et al. | |
| 6,520,647 B2 | 2/2003 | Raskar | |
| 6,619,804 B2 | 9/2003 | Davis et al. | |
| 6,686,973 B2 | 2/2004 | Su | |
| 6,712,475 B2 | 3/2004 | Davis et al. | |
| 6,724,377 B2 * | 4/2004 | Ouchi et al. | 345/204 |

(Continued)

OTHER PUBLICATIONS

Haddad, R.A., et al., "Digital Signal Processing—Theory, Applications, and Hardware," 1991, Computer Science Press, W.H. Freeman and Company, New York, pp. 202-232.

*Primary Examiner*—Yosef Kassa
(74) *Attorney, Agent, or Firm*—Wade James Brady, III; Frederick J. Telecky, Jr.

(57) ABSTRACT

A digital keystone correction process locates image points in a corrected image from image points in a distorted image that was produced by misalignment of the axis of a sensor such as a camera. The correction process locates corrected image points by constructing intercept points that are the intersections of the extended sides of a quadrilateral in the distorted image plane that is constructed from a known rectangular feature in the subject plane. Reference points are located by drawing a line through each intercept point and the distorted image point. Distances are found from the intercept points to the image points and the reference points. The distances are scaled and corrected with an offset to locate the coordinates of the image points in the corrected image plane. This process can correct alignment errors of pitch, yaw, and roll between the subject plane and an image plane such as photographic film.

18 Claims, 3 Drawing Sheets

U.S. PATENT DOCUMENTS 6,753,907 B1  6/2004  Sukthankar et al.
6,765,544 B1  7/2004  Wynne Willson
6,802,614 B2  10/2004  Haldiman

* cited by examiner

SYSTEM AND METHOD FOR TWO-DIMENSIONAL KEYSTONE CORRECTION FOR AERIAL IMAGING

CROSS REFERENCE TO RELATED APPLICATIONS

The following related U.S. patents and/or commonly assigned patent applications are hereby incorporated herein by reference:

| U.S. Pat. No. or Ser. No. | Filing Date | Issue Date | Attorney Docket No. |
| --- | --- | --- | --- |
|  | Mar. 9, 2005 |  | TI-39288 |
|  | Mar. 9, 2005 |  | TI-39900 |
| 6,712,475 | Aug. 31, 2001 | Mar. 30, 2004 |  |

TECHNICAL FIELD

The present invention relates generally to a system and method for image keystone correction, and more particularly to a system and method for two-dimensional keystone correction of photographic or electronically processed images.

BACKGROUND

Aerial images of the earth's surface and its natural and man-made features taken from elevated platforms such as balloons, airplanes, and satellites are widely used for making maps, predicting weather, recording surface feature changes, identifying ground-based activities, and numerous other economic purposes. Invariably, images taken from an aerial camera, whether made using traditional photographic or electronic means, are not produced with alignment of the camera's photographic axis with the local vertical or rotational axis of the subject plane. Misalignment of the camera and object axes produces keystone distortion or a rotation of the recorded image. Such misalignment and rotation also occur for ordinary ground-based images taken from stationary or moving locations such as a picture of a building photographed from a location on a street, or of a land area photographed from an elevated location. Keystone distortion results in a geometric skewing of the location of the points or pixels in the captured image; or the picture may also be rotated in the image plane.

It is often important that points in the captured but distorted image be accurately located. For example, an accurate distance between two objects observable in the captured image may be required, which cannot be determined directly from measurements on a keystone-distorted image. In addition, when multiple images are sequenced and assembled to form a mosaic or a larger image than can be viewed with a single exposure, angular and rotational misalignments that produce distortion between adjacent images can result. Thus, the resulting recorded images can exhibit keystone and rotational distortions that must be resized by a geometric transformation of the captured images before they can be used for an end purpose.

FIG. 1 illustrates a photograph being taken of a rectangular plot of land 106 that lies on a "subject plane" with a rectangular grid 108. The photograph is taken from a camera 104 such as an elevated camera carried by an aircraft 102. The axis 110 of the camera is shown misaligned with the local vertical 112.

On FIG. 2, an exemplary resulting photograph 203 is illustrated that contains the "distorted image" of the rectangular plot of land lying on a "distorted image plane" and shows the rectangular plot of land as the general quadrilateral 206. The image of the rectangular grid 208 is correspondingly distorted, preventing direct measurement of distances that were recorded on the distorted image plane. To accommodate accurate measurements on a recorded image or to display a recorded image without keystoning or rotation, points on the distorted image plane must be mapped into a "corrected image" on a "corrected image plane" that restores the geometry and rotational alignment of the original subject. Thus, there are three "planes" that are discussed herein: a subject that lies on a "subject plane," a distorted image that lies on a "distorted image plane," and a corrected image that lies on a "corrected image plane." The corrected image plane is ideally a scaled version of the subject plane.

A prior art method for correcting or accounting for keystone distortion for image processing systems is manual image correction, such as by physically moving the camera or other image acquisition device to align the optical axes. However, the system components may not be accessible for adjustment, or there may be a physical limitation on the placement of the imaging components that prevent sufficient adjustment to correct the distortion, such as in aerial photography. Another prior art method is to provide adjustable optical elements in the image processing system, such as special-purpose lenses, mirrors and mechanical arrangements that can correct keystone distortion. However, this approach may only be able to correct small distortions, and can be cost prohibitive or inconvenient to use because it relies on mechanical elements. Other, prior art methods for two-dimensional keystone correction are generally computationally intensive and may require a trigonometric transformation of the input data based on the angular misalignment of the camera and the subject plane, which may not be known at the time the image is corrected or processed. These computationally intensive approaches may also be cost prohibitive or otherwise impractical for many applications. This is particularly true for images electronically acquired, such as raster-scanned image, acquired by a Charge Coupled Device (CCD) camera or other electronic means that can produce multi-million pixels per image, and produce 60 or more images per second. Thus, what is needed in the art is a process for image keystone correction that can accurately locate points on a corrected image plane for recorded, processed, or displayed images that is not computationally intensive and does not require angular data that represents misalignment of the imaging components.

SUMMARY OF THE INVENTION

These and other problems are generally solved or circumvented, and technical advantages are generally achieved, by preferred embodiments of the present invention. These embodiments utilize a digital keystone correction process to locate points from an image in a subject plane that is produced with misalignment of the axis of a sensor, such as a camera, and an axis of the subject plane. The digital keystone correction process locates image points for a corrected image on a corrected image plane, corresponding to image points for a distorted image on a distorted image plane using a known rectangular feature in the subject plane. The process constructs two intercept points ("vanishing points") that are the intersections of the lines which are extensions of the top and bottom edges and the left and right sides of a quadrilateral in the distorted image plane that is constructed from the known rectangular feature in the subject plane. Vertical and horizontal reference points are located by drawing a line through each intercept point and the image point in the distorted image plane. Distances are found from the intercept points on the distorted image plane in relation to the image points and reference points. The distances are scaled and corrected with an offset to locate the points for the corrected image on the corrected image plane.

The process of the present invention can preferably be incorporated into a device that includes a microprocessor, or other digital processing circuitry, to produce corrected images from distorted images captured on photographic film or electronic media that have keystone and/or rotational distortion. The device preferably includes a display and a button to select the corners of a quadrilateral in the distorted image plane that represents a rectangular structure in the subject plane. This process can re-position pixels, or other picture elements, to form a corrected image in a corrected image plane using the microprocessor or other digital circuitry. This process corrects alignment errors of pitch, yaw, and roll between the subject plane and a distorted image plane such as photographic film or an electronic imaging medium, i.e., an electronic file. The coordinates of points in the subject plane can be computed using the process of the present invention, and the distance between two points in the corrected image plane or in the subject plane can be determined.

Another embodiment of the present invention is a method for performing digital keystone correction. The method locates points in an image within a subject plane that are produced with misalignment of the axis of a sensor such as a camera and the axis of the subject plane. The digital keystone correction process includes locating image points for a corrected image on a corrected image plane corresponding to image points for a distorted image on a distorted image plane. The method includes constructing two intercept points ("vanishing points") by finding intersections of the lines which are extensions of the top and bottom edges and the left and right sides of a quadrilateral in the distorted image plane that is a known rectangle in the subject plane. The method further includes locating vertical and horizontal reference points by drawing a line through each intercept point and the image point in the distorted image plane. The method further includes finding distances from the intercept points on the distorted image plane to these image points and the reference points. The method further includes scaling and correcting the distances with an offset to locate the points for the corrected image on the corrected image plane. The method can correct alignment errors of pitch, yaw, and roll between the subject plane and a distorted image plane such as photographic film or an electronic imaging medium such as an electronic file. The coordinates of points in the subject plane can be computed using the method of the present invention, and the distance between two points in the subject plane can be determined.

An advantage of a preferred embodiment of the present invention is that points from an image in a subject plane, including a known rectangular feature that was captured with misalignment of the axis of a sensor such as a camera or other image recording device and the axis of the subject plane, can be accurately located without angular alignment data between the subject and image planes, and without sensor or projector data such as lens offset and throw ratio. The process and method are not computationally intensive, and can be used to correct multiple independent alignment errors between the subject and image planes.

The foregoing has outlined rather broadly the features and technical advantages of the present invention in order that the detailed description of the invention that follows may be better understood. Additional, features and advantages of the invention will be described herein below, to form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an image keystone correction system such as one utilizing a camera or electronic image recording process that acquires images of an object with one or more axes of the subject plane misaligned to one or more axes of the camera or electronic image recording process. The image keystone correction process locates image points for the corrected image using a geometric transformation that computes the distances of two constructed intercept points in the distorted image plane, derived from a known rectangular feature in the subject plane, to image points and to vertical and horizontal reference points. The vertical and horizontal reference points are located by drawing a line through each of the two intercept points and the image points in the distorted image plane. Scaling the distances and adding an offset determine the location of the corrected image points on the corrected image plane. The invention may be applied to other image acquisition systems such as those using ordinary chemical photographic means to acquire an image, including systems that may convert an acquired image to an electronic medium such as an electronic file or stream of electronic data.

The invention may include a device configured with a display and an input device, such as a button to view and select the corners of the rectangular feature that was on the original subject plane. A microprocessor or other digital circuitry can be used to perform the calculations necessary for the keystone correction system.

Figure 1:
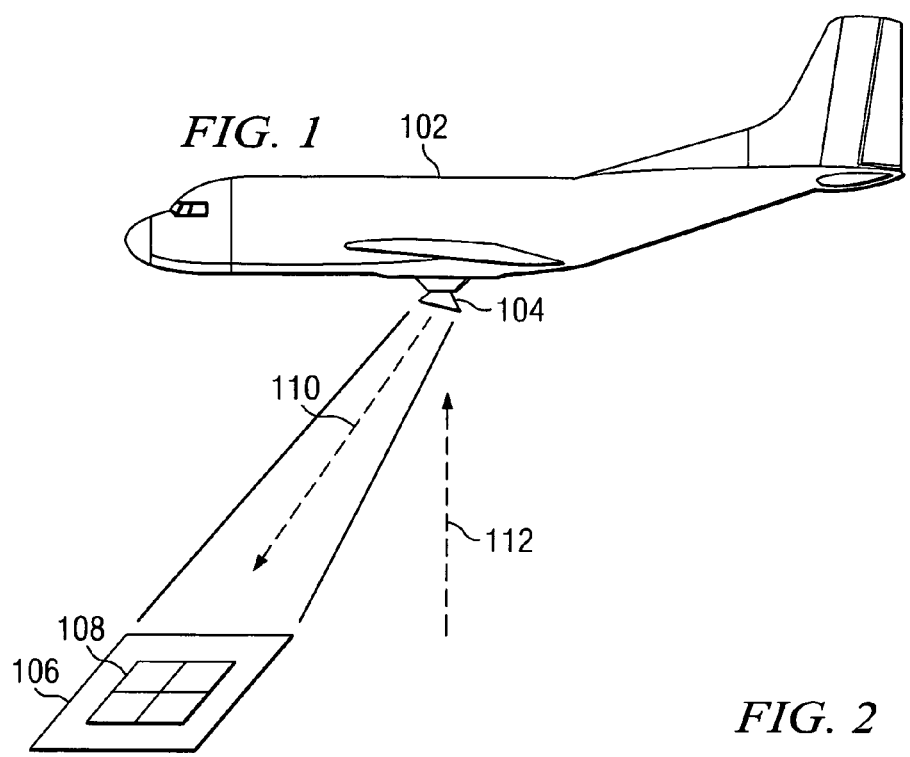
FIG. 1 is an illustration of a camera mounted on an aircraft and misaligned with a normal to the surface of the earth.
Figure 2:
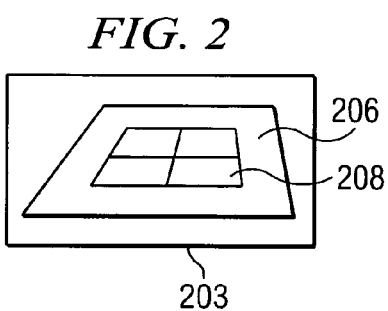
FIG. 2 is an illustration of an exemplary image acquired by the camera illustrated on FIG. 1.
Figure 3:
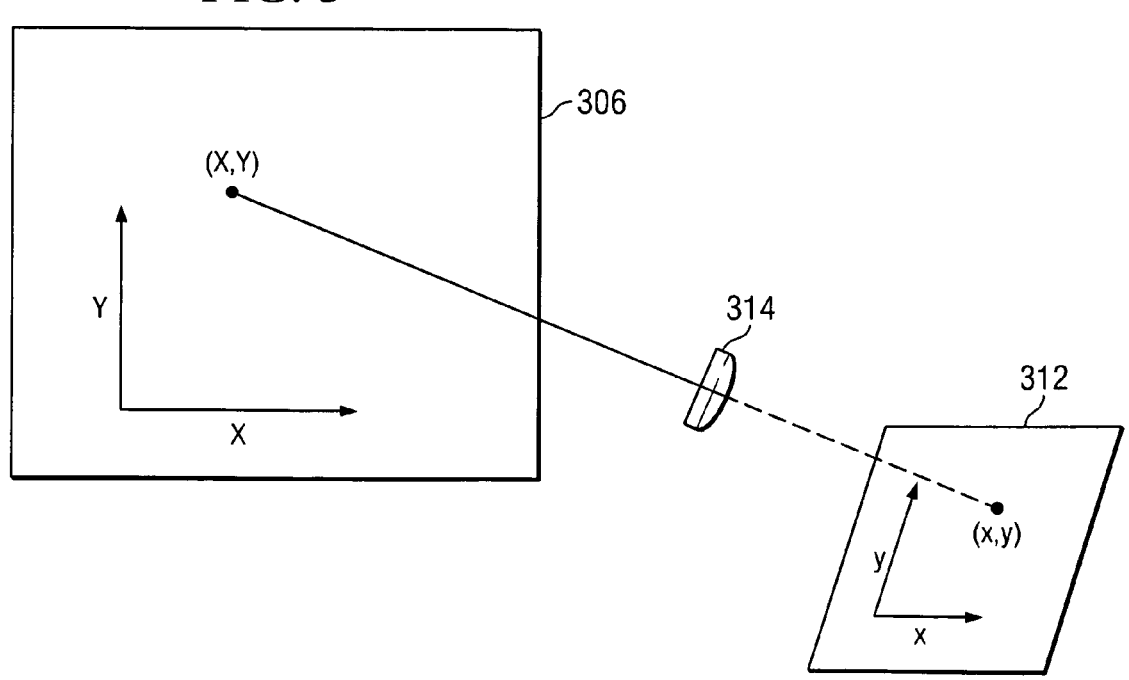
FIG. 3 is an illustration of a subject plane and an image plane with misaligned axes.

Turning now to FIG. 3, illustrated is a subject plane 306 containing an image to be recorded or viewed, and a distorted image plane 312 onto which a distorted image will be recorded. An optical system such as a camera is configured with a set of lenses, such as 314, to produce an image on the distorted image plane where either a sensor such as photographic film, a CCD device, a CMOS device or other recording or imaging device is located. The subject plane and the distorted image plane are generally not parallel to each other, and one may also be rotated with respect to the other. The optical system in these cases can be considered to map points from one plane to points on the other plane producing keystone distortion and/or a rotation of axes. A process and method of the present invention for determining a mapping from the distorted image plane to a corrected image plane is described herein, which can be executed digitally such as by using a microprocessor.

The mapping of the present invention allows distortions to be corrected that are caused by misalignment of the subject plane and the distorted image plane and a possible rotation relative to each other. In the case of a camera, the image taken by the camera can be digitally corrected for keystoning and rotation so that there is no distortion (aside from an overall change of scale) in a corrected image produced from a distorted image, which may be a printed photograph of an object in a subject plane.

Figure 4:
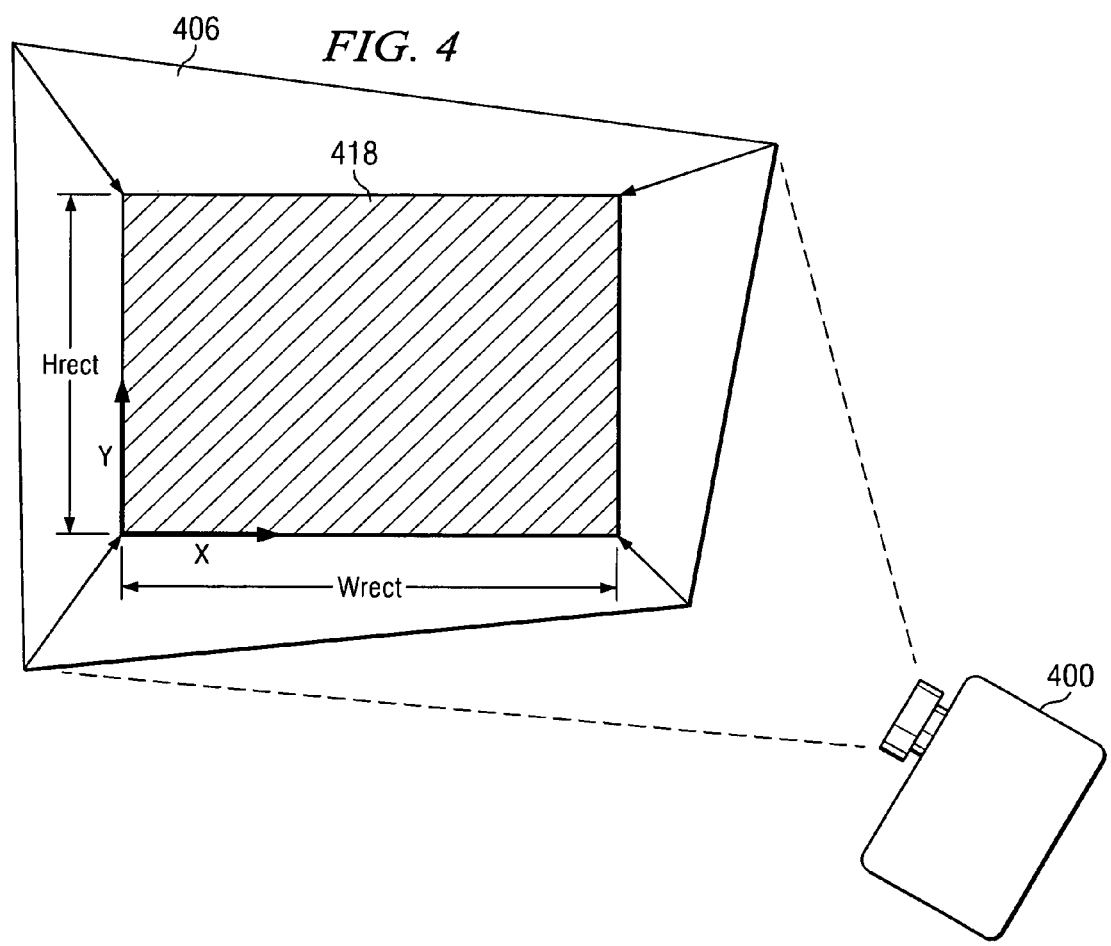
FIG. 4 is an illustration of the corner points of a quadrilateral on a distorted image plane.

To form a corrected image using methods of the prior art, the rotational position and attitude error (pitch, yaw, and roll) of the camera or projector must be known, and the lens offset and throw ratio (lens focal length divided by the horizontal width of the imager). The process and method of the present invention do not require such information about the optical system. Instead the process and method rely on known points in a subject plane that form a rectangular feature in a subject plane. As illustrated on FIG. 4, the width, $W_{rect}$, and height, $H_{rect}$ of a rectangular feature 418 on a subject plane 406 acquired by a camera 400 are used. In the case of aerial photography, width and height data might include data for a grid of streets with known separation, a rectangular plot of land with determinable dimensions, or a set of surveyed points. If scale is unimportant or can be determined by two points separated by a known distance in the subject plane, then only the ratio $W_{rect}/H_{rect}$ is needed. In this case, the height of the rectangle $H_{rect}$ can be set to unity in the equations below and the width of the rectangular feature $W_{rect}$ can be set to $W_{rect}/H_{rect}$.

For aerial photography, an advantage of the process and method of the present invention over prior art is that it can be applied to archival photographs and to photographs where it is impractical to accurately obtain the camera rotational position relative to the subject plane. In the case of projectors, the optical offset and throw ratio are often not accessible because they may be user adjustable and there may be no procedure or mechanism for recording these values. The process and method of the present invention do not need these parameters but rather rely on a rectangular feature on the subject plane as indicated above.

Figure 5:
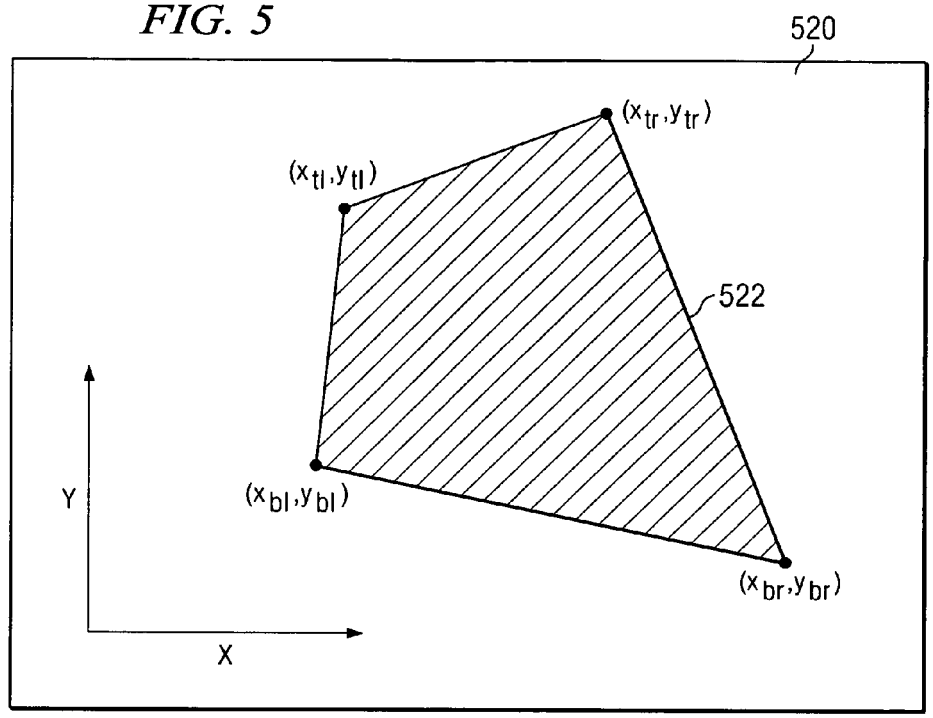
FIG. 5 is an illustration of a resized rectangle on an image plane using a preferred embodiment approach of the present invention.

Illustrated on FIG. 5, the four points $(x_{tl},y_{tl})$, $(x_{tr},y_{tr})$, $(x_{bl},y_{bl})$, and $(x_{br},y_{br})$ forming the corners of a quadrilateral 522 are shown on a distorted image plane 520 resulting from acquisition of a rectangle (not shown) on a subject plane.

Figure 6:
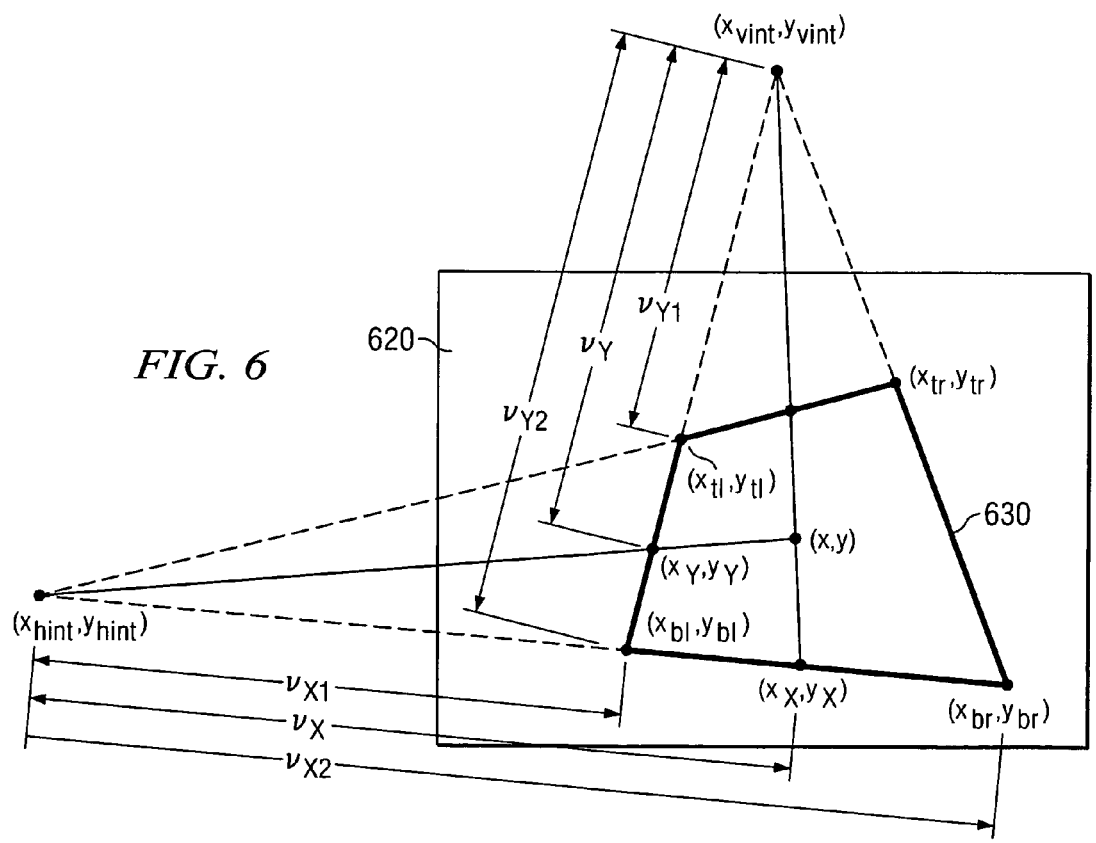
FIG. 6 is an illustration of keystone correction using a preferred embodiment approach of the present invention.

There are two coordinate systems to consider in the mapping process of the present invention. The first is the coordinate system associated with the image on a corrected image plane, denoted as the X-Y coordinate system (using capital letters to designate corrected image plane coordinates), and the second is associated with a distorted image on a distorted image plane from an image recording or processing device, denoted as the x-y coordinate system (using lower-case letters to designate distorted image plane coordinates). The mapping from the distorted image plane coordinate system to the corrected image plane coordinate system is:

$$X = f_X(x, y)$$

$$Y = f_Y(x, y)$$

where the mapping functions $f_X$ and $f_Y$ will be described below. The inputs needed to define this mapping are the coordinates of the four corners of the quadrilateral in the distorted image plane that was a rectangle in the subject plane, i.e., the points:

$(x_{tl}, y_{tl})$, $(x_{tr}, y_{tr})$, $(x_{bl}, y_{bl})$, and $(x_{br}, y_{br})$ Turning now to FIG. 6, illustrated on a display device 620 are the coordinates of the intercepts of the top and bottom lines of the rectangle $(x_{hint}, y_{hint})$, that and the left and right sides of the rectangle $(x_{vint}, y_{vint})$ can be determined by extending the top and bottom lines of the quadrilateral 630 and the left and right sides of the quadrilateral 630. Determination of intersections (intercept points) of non-parallel straight lines is well known in the art and will not be described herein in the interest of brevity. The points $(x_X, y_X)$, and $(x_Y, y_Y)$ on the left side and bottom side of the rectangle, respectively, can be determined from the intersection of two lines passing through the point to be mapped (x,y) and the points $(x_{hint}, y_{hint})$ and $(x_{vint}, y_{vint})$. In addition, the point $(x_Y, y_Y)$ illustrated on FIG. 6 corresponds to the point (0,Y) on the corrected image plane (not shown), where the origin of the X-Y coordinate system on the corrected image plane is taken to be the bottom left corner of the quadrilateral 630. Similarly, the point $(x_X, y_X)$ corresponds to the point (X,0) on the corrected image plane, and the point $(x_{bl}, y_{bl})$ corresponds to the point (0,0) on the corrected image plane.

To perform the mapping of the present invention, define the distances $v_x$, $v_{x1}$, and $v_{x2}$ illustrated on FIG. 6 by:

$$v_X = ((x_X - x_{hint})^2 + (y_X - y_{hint})^2)^{1/2}$$

$$v_{X1} = ((x_{bl} - x_{hint})^2 + (y_{bl} - y_{hint})^2)^{1/2}$$

$$v_{X2} = ((x_{br} - x_{hint})^2 + (y_{br} - y_{hint})^2)^{1/2}$$

and the ratio $S_X$ by;

$$S_X = \frac{v_{X2} - v_{X1}}{W_{rect}}$$

Then the X-coordinate of the image point on the corrected image plane is given by:

$$X = -\frac{v_{X1} v_{X2}}{v_X S_X} + \frac{v_{x2}}{S_X} \qquad \text{(Equation 1)}$$

which is a scaling by a constant, that is fixed for a given image, of the distance of the point on the distorted image plane from an intercept point, that is also fixed for the given image, plus an offset that is fixed for the given image. Similarly, for the Y coordinate, define the distances $v_Y$, $v_{Y1}$, and $v_{Y2}$ illustrated on FIG. 6 by;

$$v_Y = ((x_Y - x_{vint})^2 + (y_Y - y_{vint})^2)^{1/2}$$

$$v_{Y1} = ((x_{bl} - x_{vint})^2 + (y_{bl} - y_{vint})^2)^{1/2}$$

$$v_{Y2} = ((x_{br} - x_{vint})^2 + (y_{br} - y_{vint})^2)^{1/2}$$

and the ratio $S_Y$ by;

$$S_Y = \frac{v_{Y2} - v_{Y1}}{H_{rect}}.$$

Then the Y-coordinate of the image point on the corrected image plane is given by:

$$Y = -\frac{v_{Y1} v_{Y2}}{v_Y S_Y} + \frac{v_{Y2}}{S_Y} \quad \text{(Equation 2)}$$

which again is a scaling by a constant, that is fixed for the given image, of the distance of the point on the distorted image plane from an intercept point, that is also fixed for the given image, plus an offset that is fixed for the given image.

The intercept points in the distorted image plane illustrated on FIG. 6 may fall to the left or right of the quadrilateral 630, or above or below it. The point (x,y) is not constrained to fall within the quadrilateral 630.

Using Equations 1 and 2, any point (x,y) in the distorted image plane can be accurately mapped to a corresponding point (X,Y) in the corrected image plane. Points in the corrected image plane can be scaled to locate the original points in the subject plane, because the two planes are geometrically similar.

For an aerial photograph, the mapping to produce a corrected image as described by Equations 1 and 2 can be used to accurately determine distances between two points on a recorded image on a distorted image plane by converting from (x,y) coordinates on the distorted image plane to (X,Y) coordinates on the corrected image plane, or scaled differently to find distances on the original subject plane.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A device configured to correct keystone distortion of a distorted image captured with misalignment of the axes of a sensor and a subject plane, comprising:
   a display configured to exhibit corners of a quadrilateral that represents a known rectangular feature in the subject plane; and
   digital circuitry configured:
      to locate intercept points that are the intersections of lines that are extensions of the top and bottom edges and the left and right sides of the quadrilateral;
      to locate vertical and horizontal reference points on sides of the quadrilateral by drawing a line through each intercept point and an image point of the distorted image;
      to compute distances from the respective intercept points to the image point of the distorted image and to the respective reference points; and
      to scale and correct the distances with an offset to locate a corresponding image point of a corrected image.

2. A device to correct keystone distortion according to claim 1, wherein alignment errors of pitch, yaw, and roll between the subject plane and the distorted image plane are corrected.

3. A device to correct keystone distortion according to claim 1, wherein the corrected image is stored in an electronic medium.

4. A device to correct keystone distortion according to claim 1, wherein corrected distances between image points in the distorted image are computed.

5. A device to correct keystone distortion according to claim 1, wherein the distorted image is captured from an aircraft.

6. A device to correct keystone distortion according to claim 1, wherein the known rectangular feature is defined by intersecting streets.

7. A device to correct keystone distortion according to claim 1, wherein the distorted image is a photographic image.

8. A method to locate an image point of a corrected image in a corrected image plane from a corresponding image point of a distorted image in a distorted image plane that was produced from an image in a subject plane containing a known rectangular feature, comprising:
   locating intercept points that are the intersections of lines that are extensions of the top and bottom edges and the left and right sides of a quadrilateral in the distorted image plane that represents a known rectangle in the subject plane;
   locating vertical and horizontal reference points on sides of the quadrilateral in the distorted image plane by drawing a line through each intercept point and the image point of the distorted image;
   determining distances from the respective intercept points to the image point of the distorted image and to the respective reference points; and
   scaling and correcting the distances with an offset to locate the image point of the corrected image on the corrected image plane.

9. The method according to claim 8, including correcting alignment errors of pitch, yaw, and roll between the subject plane and the distorted image plane.

10. The method according to claim 8, including producing the distorted image on photographic paper.

11. The method according to claim 8, including computing the distance between two image points of a corrected image in a corrected image plane.

12. The method according to claim 8, including capturing the distorted image from an aircraft.

13. The method according to claim 8, including defining the known rectangular feature by intersecting streets.

14. A method for locating an image point in a corrected image of a geographic area from a corresponding image point of a distorted image of the geographic area, wherein the distorted image of the geographic area was captured from a position of altitude, wherein the plane of the distorted image is skewed relative the plane of the geographic area comprising:
   (a) selecting a quadrilateral in the image that corresponds to a known rectangular feature in the geographic area;
   (b) extending the top and bottom edges of the quadrilateral to define a first intercept point, and the left and right sides of the quadrilateral to define a second intercept point;
   (c) locating a first reference point, being the point of intersection of (i) one of the top and bottom edge of the quadrilateral, and (ii) a line connecting the first intercept point and the image point of the distorted image;
   (d) locating a second reference point, being the point of intersection of (i) one of the left and right side of the quadrilateral, and (ii) a line connecting the second intercept point and the image point of the distorted image;
   (e) determining a first distance between the first intercept point and the first reference point and a second distance between the first intercept point and the image point of the distorted image;
   (f) determining a third distance between the second intercept point and the second reference point and a fourth distance between the second intercept point and the image point of the distorted image;
   (g) applying a predetermined offset value to the first, second, third, and fourth distances, respectively, to obtain first, second, third, and fourth offset distances, respectively; and
   (h) using the first, second, third, and fourth offset distances, respectively, to locate the image point of the corrected image.

15. The method according to claim 14, wherein the distorted image is captured from an aircraft.

16. The method according to claim 14, wherein the known rectangular feature is defined by intersecting streets.

17. The method according to claim 14, wherein the distorted image is a photographic image.

18. The method according to claim 14, further comprising:
   (i) repeating the steps (a) through (h) for a second image point; and
   (j) determining a distance between the first image point and the second image point.

* * * * *